United States Patent [19]
Horikawa et al.

[11] Patent Number: 5,732,444
[45] Date of Patent: Mar. 31, 1998

[54] TURNING METHOD AND TURNING MECHANISM IN EYEGLASSES

[75] Inventors: Kaoru Horikawa; Kazumi Komatsubara, both of Sabae, Japan

[73] Assignees: Horikawa Co., Ltd.; Boston Club Co., Ltd., both of Fukui-ken, Japan

[21] Appl. No.: 510,741

[22] Filed: Aug. 3, 1995

[30] Foreign Application Priority Data

Aug. 6, 1994 [JP] Japan .................... 6-204417

[51] Int. Cl.$^6$ .................................... G02C 5/22
[52] U.S. Cl. .................................... 16/228; 351/153
[58] Field of Search .................. 16/228, 373; 351/153, 351/140

[56] References Cited

U.S. PATENT DOCUMENTS

| | | |
|---|---|---|
| 1,899,402 | 2/1933 | Verre . |
| 1,955,690 | 4/1934 | Spill . |
| 1,970,196 | 8/1934 | Rodemeyer ............... 351/153 |
| 4,780,928 | 11/1988 | De Lorenzo Poz ............... 351/153 |
| 5,127,133 | 7/1992 | Brucker ............... 16/373 |

FOREIGN PATENT DOCUMENTS

| | | |
|---|---|---|
| 38 21 824 A1 | 1/1990 | Germany . |
| 3 015 058 | 6/1995 | Japan . |
| 7-415521 | 7/1995 | Japan . |
| 2 281 979 | 3/1995 | United Kingdom . |
| WO 93/22704 | 11/1993 | WIPO . |

OTHER PUBLICATIONS

Page 2 and 3 of Japanese U–M Examination Report which cites Japanese Laid Open Publication 741521 (2 pages).

*Primary Examiner*—Chuck Mah
*Assistant Examiner*—Mark Williams
*Attorney, Agent, or Firm*—Flynn, Thiel, Boutell & Tanis, P.C.

[57] ABSTRACT

A turning method and a turning mechanism in eyeglasses capable of turning a temple with respect to a bracket with a simplified mechanism without using joints or bolts. The turning mechanism comprises a bracket having a main trunk and a hook, and a temple being turnable with respect to the bracket, wherein the hook has a first part for supporting an end of the temple so that the temple is turned about the first part, and a second part for stopping turning of the temple. The turning mechanism can be made very light weight and dispense with additional parts such as bolts and nuts.

11 Claims, 7 Drawing Sheets

F I G. 5(a)
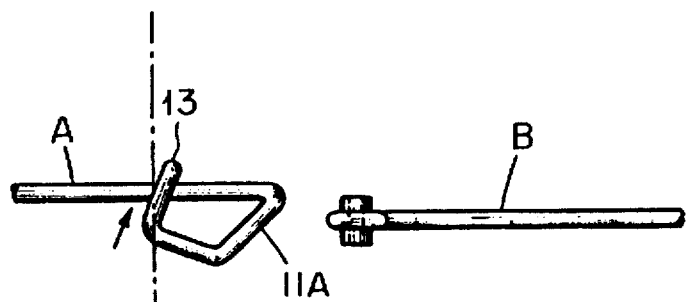
F I G. 5(b)
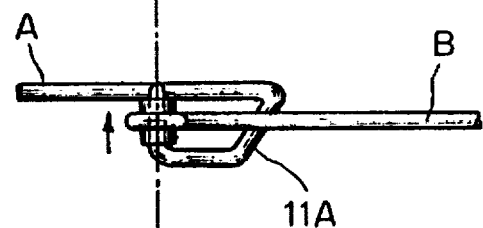
F I G. 5(c)
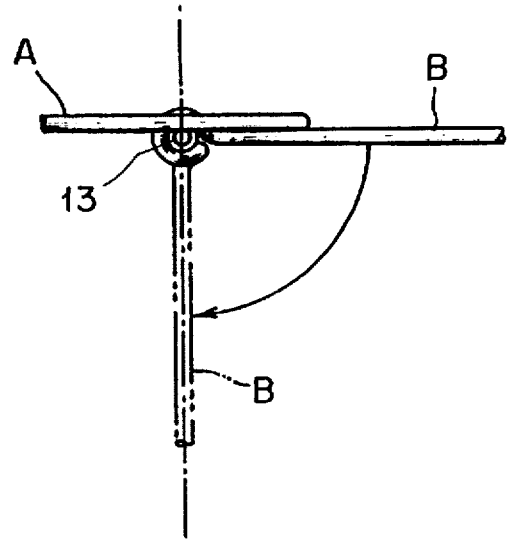

TURNING METHOD AND TURNING MECHANISM IN EYEGLASSES

BACKGROUND OF THE INVENTION

1. Field of the Invention

The present invention relates to eyeglasses, more particularly, to a turning method and a turning mechanism in the eyeglasses.

2. Prior Art

Eyeglasses having an excellent feeling of wearing such as fitness and aesthetical appearance have been desired so far.

The eyeglasses have been developed in view of manufacturing technique and their materials, and improved in their designs. As a result, the eyeglasses having a very excellent design and feeling of wearing have been recently available in a market. In view of diversity of need and development of individuality of a customer, the customer has pursued better feeling of wearing of the eyeglasses such as fitness-type eyeglasses. However, the customer has not been satisfied with the feeling of wearing of the conventional eyeglasses. Particularly, in view of inherent function of the eyeglasses, rimless eyeglasses which are very bright in visual field, light in weight, and fashionable are becoming popular.

The rimless eyeglasses have no frame body surrounding lenses and engage with side surfaces of the lenses, so that the customer is not prevented from being obstructed in a visual field.

The rimless eyeglasses have a bridge and brackets (so-called lugs) which are directly attached to lenses, whereas normal eyeglasses have brackets, on which a bridge and temples are attached, attached to each rim. The bridge, the temples and the brackets of the rimless eyeglasses are linear and very light weighted. A turning mechanism such as joints, screws or bolts has been still employed so as to turn the temples with respect to the brackets.

FIG. 7 is a prior art turning mechanism comprising a temple and a bracket coupled by joints, wherein FIG. 7(a) is a plan view and FIG. 7(b) is a side view. The bracket (usually called a lug) has two joints for receiving one end of the temple. When one end of the temple is inserted into the two joints and it is retained by a fixing member such as screws or bolts, the temple can be turned about the fixing member. Such a prior art turning mechanism using joints is called a "three piece hinge".

When using the fixing member such as the screws or the bolts, the bracket and the temple become complex in their structures and heavy in their weight.

If the temple is frequently turned about the fixing member in the prior art turning mechanism, the fixing member such as the screws or the bolts is loosened. Accordingly, such fixing member must be fixed periodically using an exclusive driver, etc., which has been very troublesome.

Further, the turning mechanism comprising the joints, screws or the bolts requires many parts and complicated manufacturing process, which hinders the reduction of manufacturing cost. Accordingly, it has been important to simplify the turning mechanism using the joints for developing lightweight rimless eyeglasses.

SUMMARY OF THE INVENTION

The present invention meets such requirements and solves the aforementioned problems. That is, the inventors have devoted themselves to solve the problems of the prior art turning mechanism and found the fact that temples can be fixed to brackets without using the prior art turning mechanism such as screws or bolts by merely supporting each end of the temple arms by shaft supporters which are parts of the brackets. The inventors have completed the present invention based on this fact.

It is an object of the present invention to provide a turning method and a turning mechanism in eyeglasses capable of turning temple arms with respect to brackets without using joints and fixing member such as screws or bolts as employed in the prior art turning mechanism.

To achieve the above objects, it is a first aspect of the invention to provide a turning method in eyeglasses comprising a step of supporting a shaft provided at an end of a temple arm by a shaft supporter of a bracket so that the temple arm is attached to the bracket A so as to be turnable about the shaft supporter of the bracket.

In the first aspect of the invention, the method further comprises a step of pressing the shaft of the temple arm on the bracket so as to give resistance force to turning motion of the temple (B).

Further, in the first aspect of the invention, the method further comprises a step of stopping turning of the temple arm by a part of the bracket.

It is a second aspect of the invention to provide a turning mechanism of eyeglasses comprising a bracket having a main trunk and a hook and a temple arm being turnable with respect to the bracket, wherein the hook has a first part for supporting an end of the temple arm so that the temple arm is turned about the first part, and a second part for stopping turning of the temple arm.

In the second aspect of the invention, the first part is a shaft supporter for supporting the end of the temple arm, and the second part is a downward directed part provided between the shaft supporter and the main trunk for stopping turning of the temple arm. 5 Further, in the second aspect of the invention, the first part is a shaft supporter for supporting the end of the temple arm, and wherein the end of the temple arm is pressed on the shaft supporter and the main trunk of the bracket so as to give resistance force to turning motion of the temple arm.

Still further, it is a third aspect of the invention to provide a turning mechanism of eyeglasses comprising a bracket having a main trunk and a hook and a temple arm being turnable with respect to the bracket, wherein the temple arm has a shaft provided at an end of the temple arm, and the hook includes a shaft supporter for supporting the shaft of the temple arm, and a stop part provided between the shaft supporter and the trunk of the bracket for stopping turning of the temple arm supported by the shaft supporter so as to be turned about the shaft supporter, and wherein the end of the temple arm is pressed between the shaft supporter and the main trunk of the bracket so as to give resistance force to turning motion of the temple arm.

Since the turning method and the turning mechanism in eyeglasses are structured as mentioned above, each end of the temple arm is supported by and turnable about each shaft portion of the bracket.

BRIEF DESCRIPTION OF THE DRAWINGS

FIG. 1 shows a turning mechanism according to a first embodiment of the invention, wherein

FIG. 2 shows a turning mechanism according to a second embodiment of the invention, wherein

FIG. 3 shows a turning mechanism according to a third embodiment of the invention, wherein

FIG. 4 shows a turning mechanism according to a fourth embodiment of the invention, wherein

FIG. 5 shows a turning mechanism according to a fifth embodiment of the invention, wherein FIG. 5(a) is a side view showing a state before the temple B is attached to the bracket A, FIG. 5 (b) is also a side view showing a state after the temple B is attached to the bracket A, and FIG. 5(c) is a plan view of the turning mechanism showing a state before the temple B is turned with respect to the bracket A (solid line), and a state after the temple B is turned with respect to the bracket A (two dot broken line);

FIG. 7 shows joints in a prior art turning mechanism, wherein

PREFERRED EMBODIMENT OF THE INVENTION

First Embodiment (FIG. 1)

Figure 6A:
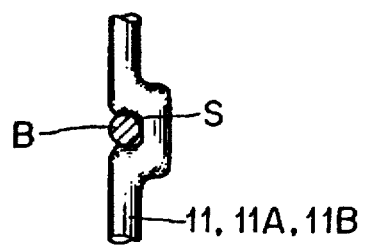
FIG. 6 is a view of a turning mechanism according to a modification of the invention showing a recess provided at a part of vertical or inclined portion of the bracket A in which the temple B is engaged.
Figure 6B:
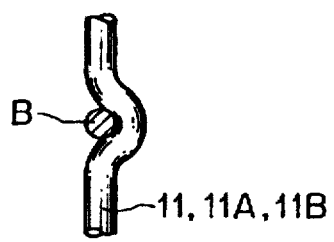
Figure 6C:
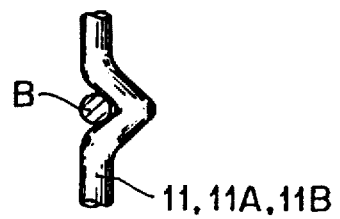
Figure 7A:
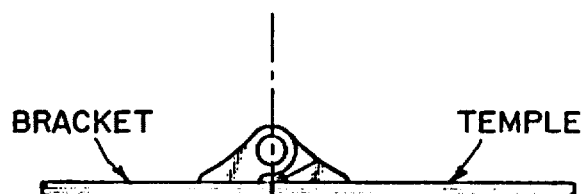
FIG. 7(a) is a plan view of the joints and FIG. 7(b) is a side view of the joints.
Figure 7B:

Elements which are described in first to fifth embodiments as illustrated in FIGS. 1 to 5 and in a modification as illustrated in FIG. 6 are denoted at the same numerals.

Figure 1A:
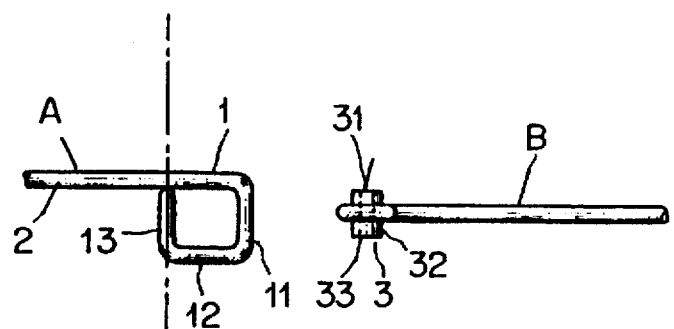
FIG. 1(a) is a side view showing a state before the temple arm B is attached to the bracket A.
Figure 1B:
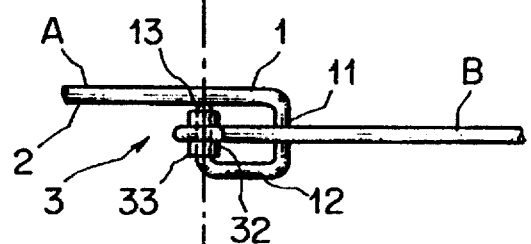
FIG. 1(b) is also a side view showing a state after the temple arm (hereafter arm) B is attached to the bracket A.
Figure 1C:
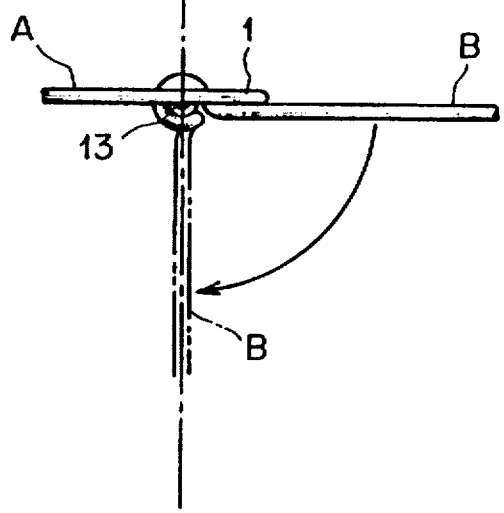
FIG. 1(c) is a plan view of the turning mechanism showing a state before the temple B is turned with respect to the bracket A (solid line), and a state after the temple B is turned with respect to the bracket A (two dot broken line)

A first embodiment of the invention will be now described with reference to FIG. 1 showing a turning mechanism provided between a temple B and a bracket A. FIG. 1(a) is a side view of the turning mechanism showing a state before a cylindrical shaft 3 of the temple B is attached to a shaft supporter 13 of the bracket A, FIG. 1(b) is the same side view showing a state after the shaft 3 is attached to the shaft supporter 13, and FIG. 1(c) is a plan view of the turning mechanism showing a state before the temple B is turned with respect to the bracket A (solid line), and a state after the temple B is turned with respect to the bracket A (two dot broken line).

Each bracket A is attached to each lens of the eyeglasses and is normally called as "lug".

The bracket A preferably employs a linear material which is made of metal such as stainless steel, iron, chromium, copper, nickel, zinc, aluminum, manganese, gold, titanium, cobalt, or alloy comprising a group selected from the group comprising the aforementioned metals, and plastic material such as cellulose, acetate, polyamide, and epoxy.

The bracket A comprises a main trunk 2 and a hook 1 at an end portion thereof, wherein the other end of the main trunk 2 is fixed to the lens and the hook 1 is attached to the temple B.

The hook 1 has a U-shaped configuration and comprises a downward directed part 11 which is bent downward from the main trunk 2, a laterally directed part 12 which is bent laterally from the downward directed part 11, and a shaft supporter 13 which is bent upwardly from the downward directed part 11.

Accordingly, the shaft supporter 13 is integrally coupled with the main trunk 2 by way of the downward directed part 11 and the laterally directed part 12 (these two parts are hereinafter referred to as a coupled part of the main trunk 2 and the shaft supporter 13).

The temple B has an end cover, not shown, to be hooked by an ear at one end and the shaft part 3 at the other end, wherein an inserting hole 31 is defined on the shaft 3.

The shaft 3 of the temple B is inserted onto the shaft supporter 13 of the bracket A with the hole 31 of the shaft 3 receiving the shaft supporter 13, so that the temple B is supported by the shaft supporter 13 so as to be turnable or pivotable about the shaft supporter 13.

Since the coupled part exists between the shaft supporter 13 and the main trunk 2, the turning of the temple B is stopped when the temple B is pressed on the coupled part although the temple B can be freely turned with respect to the bracket A.

When the shaft supporter 13 and the main trunk are disposed on the same plane as illustrated in solid line of FIG. 1(c), the temple B is in a state to be substantially linear with the bracket A, so that the temple B is not turned further beyond the coupled part, namely, a stop part or the downward directed part 11 and the laterally directed part 12. That is, when the temple B strikes against the downward directed part 11 of the bracket A, it is not turned further when the shaft 3 of the temple B is coupled to the shaft supporter 13 of the bracket A. The stop portion may have such a shape that it presses on the temple B when the temple B turns about the shaft supporter 13 and stops the turning of the temple B.

With such a turning mechanism, the temple B supported by the shaft supporter 13 of the bracket A can be freely turnable without using the joints, screws or bolts.

Second Embodiment (FIG. 2)

A turning mechanism according to a second embodiment of the invention will be described with refer to FIG. 2.

Figure 2A:
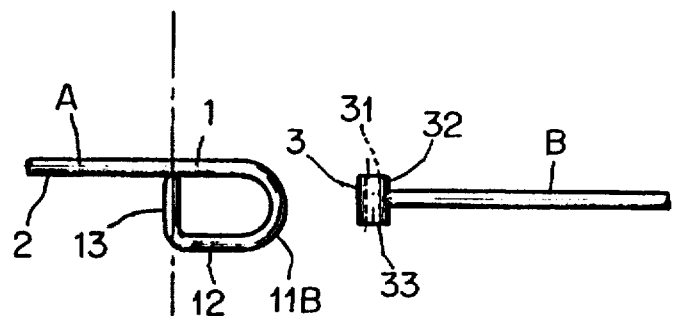
FIG. 2(a) is a side view showing a state before the temple B is attached to the bracket A.
Figure 2B:
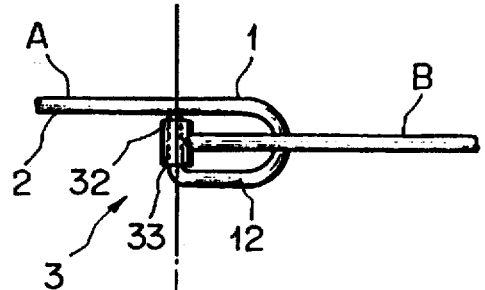
FIG. 2(b) is also a side view showing a state after the temple B is attached to the bracket A.
Figure 2C:
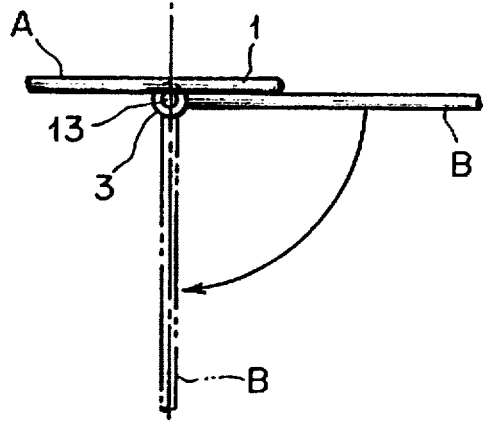
FIG. 2(c) is a plan view of the turning mechanism showing a state before the temple B is turned with respect to the bracket A (solid line), and a state after the temple B is turned with respect to the bracket A (two dot broken line)

FIG. 2(a) is a side view of the turning mechanism showing a state before the shaft 3 of the temple B is attached to the shaft supporter 13 of the bracket A, FIG. 2(b) is the same side view showing a state after the shaft 3 is attached to the shaft supporter 13, and FIG. 2(c) is a plan view of the turning mechanism showing a state before the temple B is turned with respect to the bracket A (solid line) and a state after the temple B is turned with respect to the bracket A (two dot broken line).

The second embodiment is different form the first embodiment as follows. That is, the downward directed part 11 of the hook 1 of the second embodiment is curved to form a so-called curved part 11B and the shaft 3 of the second embodiment is different from that of the first embodiment in an external appearance thereof.

The temple B supported by the shaft supporter 13 of the bracket A is turned without receiving any resistance in the first and second embodiments. However, a customer wearing the eyeglasses does not feel any resistance, i.e., moderation in his hands unless resistance force is given to some extent to the temple B when the temple B is turned about the shaft supporter 13, which causes the customer to feel as if he wore the eyeglasses of very coarse temples B. The following third embodiment solved this problem.

Third Embodiment (FIG. 3)

FIG. 3 shows a third embodiment which enables the customer to feel moderation when resistance force is given to the turning mechanism of FIG. 1.

Figure 3A:
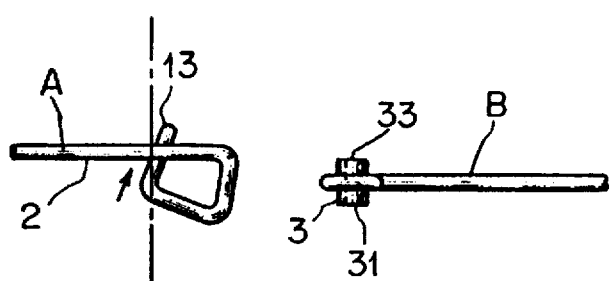
FIG. 3(a) is a side view showing a state before the temple B is attached to the bracket A, FIG. 3 (b) is also a side view showing a state after the temple B is attached to the bracket A.
Figure 3B:
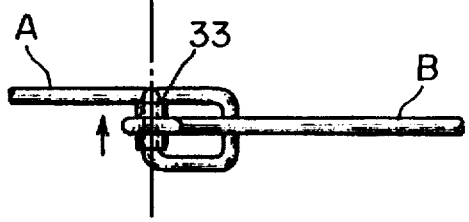
Figure 3C:
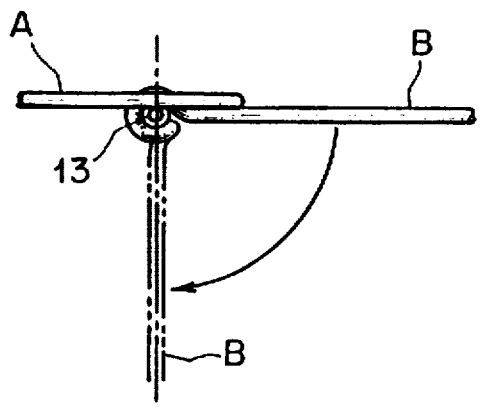
FIG. 3(c) is a plan view of the turning mechanism showing a state before the temple B is turned with respect to the bracket A (solid line), and a state after the temple B is turned with respect to the bracket A (two dot broken line)

FIG. 3(a) is a side view of the turning mechanism showing a state before the shaft 3 of the temple B is attached to the shaft supporter 13 of the bracket A, FIG. 3(b) is the same side view showing a state after the shaft 3 is attached to the shaft supporter 13, and FIG. 3(c) is a plan view of the turning mechanism showing a state before the temple B is turned with respect to the bracket A (solid line), and a state after the temple B is turned with respect to the bracket A (two dot broken line).

Since the shaft supporter 13 is strongly pressed on the main trunk 2 from the lower side thereof toward the upward direction, when the shaft 3 of the temple B is inserted into the shaft supporter 13 of the bracket A, the shaft 3 is strongly pressed between the shaft supporter 13 and the main trunk 2 of the bracket A, which gives resistance force to the turning motion of the temple B. More in detail, a side surface 33 of the shaft 3 is strongly pressed on the main trunk 2, so that frictional resistance is produced between the side surface 33 and the main trunk 2.

When the customer turns the temple B, the temple B is turned heavily due to the resistance force caused by the frictional resistance, so that the customer feels moderation.

Fourth Embodiment (FIG. 4)

FIG. 4 shows a fourth embodiment which gives resistance force to the turning mechanism of the temple B in a manner different from the manner in the third embodiment.

Figure 4A:
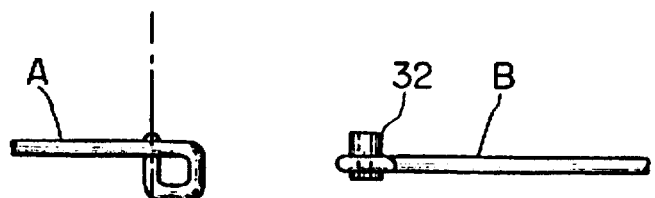
FIG. 4(a) is a side view showing a state before the temple B is attached to the bracket A, FIG. 4 (b) is also a side view showing a state after the temple B is attached to the bracket A.
Figure 4B:
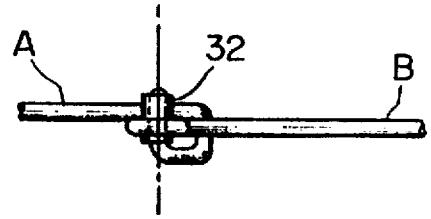
Figure 4C:
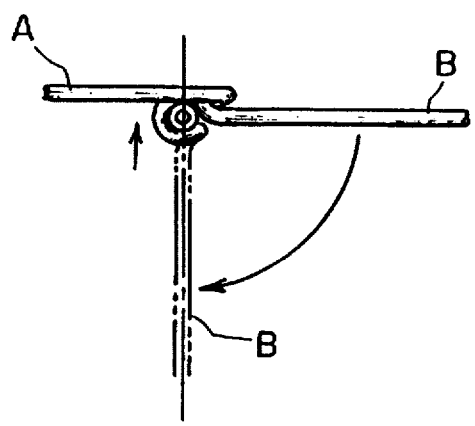
FIG. 4(c) is a plan view of the turning mechanism showing a state before the temple B is turned with respect to the bracket A (solid line), and a state after the temple B is turned with respect to the bracket A (two dot broken line)

FIG. 4(a) is a side view of the turning mechanism showing a state before the shaft 3 of the temple B is attached to the shaft supporter 13 of the bracket A, FIG. 4(b) is the same side view showing a state after the shaft 3 is attached to the shaft supporter 13, and FIG. 4(c) is a plan view of the turning mechanism showing a state before the temple B is turned with respect to the bracket A (solid line), and a state after the temple B is turned with respect to the bracket A (two dot broken line).

When the shaft 3 of the temple B is inserted into the shaft supporter 13 of the bracket A, while the shaft supporter 13 of the bracket A is strongly pressed on the main trunk 2 from the lateral direction, the shaft supporter 13 is strongly pressed between the shaft supporter 13 of the bracket A and the main trunk 2 of the bracket A, which gives resistance force to turning motion of the temple. More in detail, a peripheral surface 32 of the shaft 3 is strongly pressed on the main trunk 2, so that frictional resistance is produced between the peripheral surface 32 and the main trunk 2.

When the customer turns the temple B, the temple B is turned heavily due to the resistance force caused by the frictional resistance, so that the customer feels moderation.

Fifth Embodiment (FIG. 5)

FIG. 5 shows a fifth embodiment of the invention wherein the downward directed part 11 of the coupled part in the third embodiment has an inclined part 11A.

FIG. 5(a) is a side view of the turning mechanism showing a state before the shaft 3 of the temple B is attached to the shaft supporter 13 of the bracket A, FIG. 5(b) is the same side view showing a state after the shaft 3 is attached to the shaft supporter 13, and FIG. 5(c) is a plan view of the turning mechanism showing a state before the temple B is turned with respect to the bracket A (solid line), and a state after the temple B is turned with respect to the bracket A (two dot broken line).

Although the temple B can be freely turned with respect to the bracket A, because of the presence of the inclined part 11A of the coupled part, the temple B strikes against the inclined part 11A, which prevents the temple B from being further turned.

When the customer wears eyeglasses, the temples B are supported by his ears, so that the temples B always receive force in an upward direction about the shaft supporters 13, and hence much load is applied to the shaft supporters 13.

In FIG. 5, since the temple B per se is slightly elastic, the temple B is operated to get over the inclined part 11A of the coupled part and move along the inclined part 11A when the temple B is likely to open or to be turned, so that downward repulsive force is applied to the temple B in a downward direction.

As a result, a reverse force is applied to the temple B in the direction to cancel the upward force which is always applied to the temple B, so that the load to be applied to the shaft supporter 13 is lessened.

Modification (FIG. 6)

FIG. 6 show a modification of the coupled part in the first to fifth embodiments. The downward directed part 11, the inclined part 11A or the curved part 11B of the coupled part of the bracket A has a recess S at a portion where the temple B contacts.

The recess S has various shaped such as triangular, round, square shapes, etc. In a dynamic point of view, no excessive load is applied to the turning mechanism since the shaft 3 of the temple B engages in the recess S, and the force supporting the temple B is dispersed to the downward directed part 11, the inclined part 11A or the curved part 11B.

Although the invention is described with reference to first to fifth embodiments and the modification thereof, it is a matter of fact that the invention is not limited to those embodiments and modification but it can be variously modified unless deviating from the scope of protection.

For example, the coupled part, namely, stop part provided at the hook 1 is not limited to the downward directed part 11, the inclined part 11A and the curved part 11B but it may have any shape if it can stop the turning of the temple B.

The shaft 3 of the temple B may have any shape if it can be inserted into the shaft supporter 13 of the bracket A so as to be turnable about the shaft supporter 13.

Although the hook 1 is provided on the bracket A and the shaft 3 is provided on the temple B, it is a matter of course that the hook 1 and the shaft 3 are provided reversely, namely, the hook 1 is provided on the temple B and the shaft 3 is provided on the bracket A.

With such an arrangement of the invention, the turning mechanism per se can be made very light because the joints are not used, and it can dispense with additional parts such as bolts and nuts.

When the shaft 3 of the temple B is pressed between the shaft supporter 13 and the main trunk 2 of the bracket A, resistance force is given to the turning motion of the temple B, and hence the customer feels moderation when turning the temple B.

What is claimed is:

1. A turning method in eyeglasses, comprising the steps of:

bending a bracket having an elongate main trunk to create a downwardly extending part at an end of the main trunk, a laterally extending part at an end of the downwardly extending part, and an upwardly extending shaft supporter at an end of the laterally extending part;

pivotally supporting a shaft provided at an end of a temple arm on the shaft supporter of the bracket; and resisting pivotal movement of the shaft and temple arm relative to the shaft supporter and bracket by the shaft contacting the bracket.

2. The method according to claim 1, further comprising the step of stopping the pivoting of the shaft and the temple arm by contact of the temple arm against the downwardly extending part.

3. The method according to claim 1, wherein the step of pivotally supporting the shaft includes the step of resiliently displacing the laterally extending part to a position generally parallel to the main trunk, and holding the laterally extending part in the position generally parallel to the main trunk by having the shaft on the shaft supporter contact the main trunk.

4. The method of claim 3, wherein the step of resisting pivotal movement includes the step of pressing the shaft against the main trunk and laterally extending part by the resilient action of the laterally extending part.

5. The method according to claim 1, wherein the step of pivotally supporting the shaft includes the step of slidably receiving the shaft supporter within a hollow interior of the shaft.

6. A turning mechanism in eyeglasses, comprising:

a bracket having a main trunk and a hook, said hook being attached to an end of said main trunk and having a downwardly extending part attached at an end of said main trunk, a laterally extending part bent from an end of said downwardly extending part, and a shaft supporter bent upwardly from an end of said laterally extending part, and a temple arm having a shaft at one end thereof, said shaft being coupled to said shaft supporter to pivotally support said temple arm on said bracket, said shaft being pressed against said main trunk providing a resistance force to the turning of said temple arm relative to said bracket.

7. The turning mechanism according to claim 6, wherein said downwardly extending part acts as a stop piece adapted to stop the turning of said temple arm in an opening direction when said temple arm contacts said stop piece.

8. The turning mechanism according to claim 6, wherein said downwardly extending part extends downwardly at an oblique angle.

9. The turning mechanism according to claim 6, wherein said downwardly extending part is curved.

10. The turning mechanism according to claim 6, wherein said downwardly extending part has a recess therein which receives said temple arm when said temple arm is fully turned in an opening direction, and said downwardly extending part in the region of said recess acts as a stop piece preventing further turning of said temple arm in said opening direction.

11. The turning mechanism according to claim 6, wherein said laterally extending part is inclined toward said main trunk and is resiliently displaced away from said main trunk into a position generally parallel to said main trunk when said shaft receives said shaft supporter therein, said shaft is held on said shaft supporter between said main trunk and said displaced laterally extending part, and said shaft holds said laterally extending part in said position generally parallel to said main trunk.

* * * * *